United States Patent [19]
Kleinert et al.

[11] Patent Number: 4,757,101
[45] Date of Patent: Jul. 12, 1988

[54] PROCESS FOR THE PRODUCTION OF A FREE FLOWING, POWDERED ELASTOMER FILLED WITH SILICIC ACID

[75] Inventors: Walter H. Kleinert, Velen; Michael F. Mueller, Muenster; Klaus-Rudolf Meyer, Hattingen-Blankenstein; Guenter Huhn; Juergen Simon, both of Marl, all of Fed. Rep. of Germany

[73] Assignee: Huels Aktiengesellschaft, Marl, Fed. Rep. of Germany

[21] Appl. No.: 20,928

[22] Filed: Mar. 2, 1987

[30] Foreign Application Priority Data

Mar. 1, 1986 [DE] Fed. Rep. of Germany ....... 3606742

[51] Int. Cl.$^4$ .................. C08K 3/36; C08L 21/00; C08J 3/16; C08C 1/14
[52] U.S. Cl. .................. 523/220; 524/442; 524/493; 524/575
[58] Field of Search ............ 524/442, 493, 575; 523/220

[56] References Cited
U.S. PATENT DOCUMENTS 4,357,439 11/1982 Blumel et al. .................. 524/493

FOREIGN PATENT DOCUMENTS 1030616 5/1966 United Kingdom .

Primary Examiner—Herbert J. Lilling
Attorney, Agent, or Firm—Millen & White

[57] ABSTRACT

A process produces a free flowing, silicic-acid-filled, powdered elastomer wherein the silicic acid employed has the properties set out below:
(a) $SiO_2$ content: about 82-91.5% by weight;
(b) metallic oxides: about 0.5-3% by weight;
(c) loss on ignition (DIN 55 921/2—measured at 100° C.): about 8-15% by weight;
(d) moisture (DIN 53 198—measured at 105° C.): about 2-10% by weight;
(e) surface area of the primary particles according to BET: about 40-250 $m^2/g$;
(f) dibutyl phthalate absorption (ASTM D 2414-79) based on measured weight: about 170-290%.
(g) linear average of numerical distribution of secondary particles: about 10-2,000 nm;
(h) linear average of volume distribution of secondary particles: about 3-30 um;
(i) proportion of secondary particles with a diameter of less than 1 um: about 0.01-5% by weight wherein the percentages of parameters (a) to (c), added up together, must yield 100% by weight.

20 Claims, No Drawings

PROCESS FOR THE PRODUCTION OF A FREE FLOWING, POWDERED ELASTOMER FILLED WITH SILICIC ACID

BACKGROUND OF THE INVENTION

The invention relates to a process for the production of a free flowing, powdered elastomer, filled with silicic acid, by precipitating an elastomer latex in the presence of silicic acid and an auxiliary precipitant with the aid of acids, as well as to a powdered elastomer obtained in accordance with this process.

The production of free flowing, silicic-acid-filled, powdered elastomer grades has been known for some time. Numerous publications deal wtih different versions of the method. An essential feature of all procedures is coprecipitation of silicic acid (starting with water glass) and elastomer (from latex). An over-all drawback of these processes resides in the formation of large quantities of liquid which normally contain high proportions of electrolytes. Grave wastewater treatment problems are the result.

Such a process is disclosed, for example, in German Patent No. 2,030,172. In addition to the general, above-mentioned drawbacks of the process, the product is not a free flowing, powdered elastomer that can be further processed immediately. Even if a free flowing powder is obtained, the powder grain is too large. Therefore, additional grinding operations must be performed in any event. On the other hand, the patent expressly demonstrates by experiments that the desired results are not achieved by separate precipitation of silicic acid, i.e., elimination of coprecipitation, and subsequent mixing of precipitated silicic acid with the elastomer.

Also, a process has been known for precipitating elastomer latices in the presence of silicic acid (German Patent No. 1,224,481). However, this process does not involve the production of free flowing powdered elastomer. Rubber crumbs are obtained, which were the usual product at the time the application for this patent was filed. The silicic acid disclosed therein is not defined in any greater detail. Merely the examples mention the size of the surface area of the primary particles. Nothing is said about the surface area and structure of the secondary particles.

Upon further study of the specification and appended claims, further objects and advantages of this invention will become apparent to those skilled in the art.

SUMMARY OF THE INVENTION

An object of this invention is to develop a process for the production of free flowing, powdered elastomer filled with silicic acid which avoids the disadvantages discussed in connection with the prior art processes.

Upon further study of the specification and appended claims, further objects and advantages of this invention will become apparent to those skilled in the art.

These objects are attained by utilizing, in a process for forming silicic acid filled elastomer, a silicic acid exhibiting the following properties:

(a) $SiO_2$ content: about 82–91.5% by weight;
(b) metallic oxides: about 0.5–3% by weight;
(c) loss on ignition (DIN 55 921/2—measured at 1000° C.): about 8–15% by weight;
(d) moisture (DIN 53 198—measured at 105° C.): about 2–10% by weight;
(e) surface areas of the primary particles according to BET: about 40–250 $m^2/g$;
(f) DBP absorption (ASTM D 2414-79) based on measured weight: about 170–290%;
(g) linear average of quantitative distribution of secondary particles: about 10–2,000 nm;
(h) linear average of volume distribution of secondary particles: about 3–30 μm;
(i) proportion of secondary particles with a diameter of less than 1 μm: about 0.01–5% by weight wherein the percentages of parameters (a) to (c), added up together, must yield 100% by weight. Silicid acid looses on ignition chemically and physically bound water. The latter corresponds to the moisture mentioned unter (d).

The linear average of volume distribution of the primary and secondary particles amounts to about 100–15 nm, resp. 3–30 μm.

Preferred silicic acids have the parameters recited below; in this connection, it is not a compulsory condition to combine all of the following parameters in one product:

A. $SiO_2$ content: 85–90% by weight;
B. loss on ignition: 10–12% by weight;
C. moisture: 4–7% by weight;
D. surface area of the primary particles: 130–200 $m^2/g$;
E. dibutyl phthalate absorption: 200–280%;
F. linear average of numerical distribution of secondary particles: 200–600 nm;
G. linear average of volume distribution of secondary particles: 5–20 μm;
H. proportion of secondary particles with a diameter of less than 1 μm: 0.5–1.5% by weight.

Besides the aforementioned, standardized determination methods, analyses were performed of silicic acid according to Biltz/Biltz, "Ausfuehrung quantitativer Analysen"[Performance of Quantitative Analyses], page 382, 8th edition (1960)—S. Hirzel publishers, Stuttgart;

metallic oxides according to Biltz/Biltz, "Ausfuehrung quantitativer Analysen", page 396, 8th edition (1960)—S. Hirzel publishers, Stuttgart (typical metallic oxides include sodium oxide and potassium oxide.)

surface area according to J. Amer. Chem. Soc. 60: 309 (1938).

The numerical distribution was determined by measuring about 1,000 particles with the aid of photographs. The photographs were obtained with the aid of a trans electron microscope (see also W. A. Ladd—Electron Microscope and Its Application to Rubber Testing and Research, pp. 334 et seq.—Vanderbilt Rubber Handbook, New York [1958]).

The volume distribution was determined by the Microtrac method (Powder Technology 14: 287–293 [1976]).

The average values as well as data connected therewith were calculated in accordance with DIN 66 141 (Feb. 1974).

The silicic acid is contained in the elastomer in an amount of about 20 to 200 parts by weight, preferably 30 to 150 parts by weight, based on 100 parts by weight of elastomer solid in the filled elastomer powder.

The silicic acids utilized in accordance with the invention can be rendered hydrophobic with conventional adhesion promoters (for example, EP-OS No. 0 126 871).

The silicic acids utilized in accordance with the invention are obtained by adjusting for the precipitated silicic acids meeting the requirements of the properties A - F mentioned above and a particle size distribution for the secondary particles corresponding to the properties G - I. This is usually done by dispersing the precipitated silicic acids.

Appropriate precipitated silicic acids such as ULTRASIL$^R$ VNZ and ULTRASIL$^R$ VN2 are described in the pamphlet "Precipitated silic acids and silica-production, properties and application" No. PT-71-0-5-983 He of the firm DEGUSSA, Hanau, West Germany. A man skilled in the art is able to produce these precipitated silicic acids by reacting water glass with sulfuric acid.

Suitable elastomer latices are, on the one hand, those based on natural rubber of chemically degraded natural rubber and, on the other hand, those of homo- and copolymers of conjugated dienes as produced by free radical polymerization with the use of an emulsifier in accordance with known methods of prior art (see, for example, Houben-Weyl, Methoden der organischen Chemie"[Methods of Organic Chemistry]XIV/1: 712 et seq. [1961], Production of Elastomers"; Ullmanns Enzyklopeadie der technischen Chemie, 9: 325-339 [1957], as well as German Patent Nos. 679,587; 873,747; and 1,130,597). It is likewise possible to utilize mixtures of rubber latices.

Degraded natural rubber latices can be obtained, for example, according to the method of British Patent No. 749,955. However, degraded natural rubber latices which are utilized with preference are those obtained by the method disclosed in commonly assigned, copending U.S. application Ser. No. 021,031, filed Mar. 2, 1987, herein incorporated by reference. This method is characterized by treating the natural rubber in latex form with a mixture of oxygen and an inert gas and/or a compound containing the peroxide group at temperatures of about 60°-100° C.

Suitable conjugated dienes are 1,3-butadiene, isoprene, piperylene, 2-chloro-1,3-butadiene, 2,3-dichloro-1,3-butadiene, and 2,3-dimethyl-1,3-butadiene. The copolymers can be produced from one of these conjugated dienes with vinyl compounds, such as, for example, styrene, α-methylstyrene, acrylonitrile, acrylic acid, methylacrylic acid, and vinylpyridine. A styrene-butadiene latex with a styrene proportion of about 15-30% by weight is utilized with preference in the process of this invention.

The solids content of the latices generally amounts to about 20-25% by weight.

Auxiliary precipitants utilized in the process of the invention are ionic and nonionic tensides, ionic and nonionic polymers, as well as protective colloids.

Suitable ionic tensides are cationic tensides, e.g. cetyltrimethylammonium bromides. Suitable nonionic tensides are fatty alcohol polyglycol ethers, such as, for example, cetyl-$(CH_2-CH_2O)_{20}$—H.

In particular, cationic polymers, such as, for example, (subtituted) polyamines, are utilized as ionic polymers, and polyethylene polyglycol ethers are used with preference as nonionic polymers. A particularly preferred precipitant is that used in the process of commonly assigned, copending U.S. application Ser. No. 020,929 filed March 2, 1987 incorporated by reference herein.

It is furthermore possible to employ protective colloids, such as, for example, hydroxyethylcellulose.

Suitable auxiliary precipitants are described in great detail in Iler, *The Chemistry of Silica,* John Wiley and Sons, (1979).

The auxiliary precipitants are utilized in amounts of about 0.1-15 parts by weight, preferably 0.5-2 parts by weight, based on 100 parts by weight of elastomer solid in the latex.

The auxiliary precipitants as such are not novel and can be obtained commercially.

Preferably, a silicic acid suspension is prepared for performing the process of this invention. When using a commercially available silicic acid, care must be taken that it corresponds to all the previously described parameters as required by the process of the invention. Customarily, the silicic acid suspension is obtained by making a slurry of silicic acid in water then preparing a dispersion by means of a commercially available dispersing or emulsifying device.

If the suspension is employed, the latter can obtain about 2-12% by weight, preferably 9-11% by weight, of silicic acid. Alternatively, the silicic acid can be added to the latex in the dry state, optionally combined with water. It is likewise possible to prepare silicic acid from water glass (i.e., sodium silicate) with the aid of one of the conventional methods (see for example, German Patent No. 1,049,834).

The silicic acid suspension is combined with the elastomer latex, the latter usually containing the auxiliary precipitants. Precipitation of the filler-containing elastomer occurs after addition of an acid. If the combining step is carried out discontinuously, for example in an agitator-equipped reactor, the elastomer component can be added to the filler suspension under stirring. When using a continuous combining procedure, for example with the aid of two-component nozzle, a dynamic continuous mixer of a static mixer, the two streams (elastomers, including the auxiliary precipitant, and filler suspension) are simultaneously introduced into the mixing unit. During the precipitation process, a temperature of about 15°-90° C., preferably 20°-30° C. is suitable. Subsequently, the filler-containing elastomer is separated from the aqueous phase and dried under constant agitation. Typically, the amount of added silicic acid corresponds to the amount of silicic acid in the precipitated elastomer latex.

It is of no importance whether the latex is added to a silicic acid suspension, or vice versa. Also the instant of adding the auxiliary precipitants is not of governing significance. The important factors for the process of this invention reside in the constitution of the silicic acid in accordance with the invention, as well as precipitation of the elastomer latex in the presence of the silicic acid.

For conducting the process, the pH value of the filler suspension can vary over wide ranges. It is important when setting the pH that the final mixture of elastomer latex and filler suspension exhibit a pH value of about 1 to 10, preferably 3 to 8. If it should be discovered after the mixing step the pH value has not resulted in the desired complete precipitation, then this value can be readjusted even in the mixture proper.

The usual mineral acids are utilized for setting the pH value, such as, for example, sulfuric acid, phosphoric acid, of hydrochloric acid. Sulfuric acid is preferred.

In case of nonionic tensides and, respectively, polymers, a pH value of about 1-5, preferably 3-4, proved to be advantageous for the final mixture. In case of ionic tensides and, respectively, polymers, a pH value of about 6-9, preferably 7-8, is advantageous under the same conditions.

Other fillers can be utilized in combination with silicic acid, according to this invention. Among these are preferably the carbon blacks of all activity stages customarily in the rubber industry, such as, for example, SAF, ISAF, HAf carbon blacks, including their modifications FEF, GPF, APF, SRF, and MT carbon blacks. However, it is also possible to use colored carbon blacks or conductive carbon blacks with surface areas of up to 1,000 m$^2$/g (BET).

The amount of carbon black to be utilzied can be about 20 to 200 parts by weight, preferably 50-150 parts by weight per 100 parts by weight of elastomer solid within the filled elastomer powder.

In addition, other known mineral compounds can be utilized, such as kaolin, ground slate, etc. The amount of these other mineral compounds can be about 20 to 200 parts by weight, preferably 50-150 parts by weight per 100 parts by weight of elastomer solid within the filled elastomer powder.

Combinations of silicic acid and carbon blacks are possible within the limits indicated for the individual components. For example, the filled elastomer powder can contain 20-200 parts by weight silicic acid and 20-200 parts by weight carbon black, based on 100 parts by weight of elastomer solid within the filled elastomer powder.

If plasticizer oils are to be incorporated, the refinery products customary for this purpose are utilized, consisting, in dependence on the purpose of usage of the vulcanizates, preferably of aromatic, naphthenic or, respectively, paraffinic hydrocarbons. The amount of plasticizer oil to be employed is about 1 to 100 parts by weight based on 100 parts by weight of elastomer solid within the filled elastomer. The procedure for preparing a filler-containing elastomer that includes a plasticizer oil can be, for example, to combine the plasticizer oil with the filler-containing elastomer produced according to the process of this invention in suitable mixing units (for example fluid mixers).

The grades of powdered elastomer obtained in accordance with this invention exhibit a particle diameter of about 50-500 μm, preferably 200-300 μm.

An unexpected advantage of the process of this invention over the prior art processes reside in that the properties of the silicic-acid-filled elastomer powder can be purposely set. By varying the linear average value of the numerical distribution of the silicic acid, properties such as, for example, grain size or maintenance of pourabililty after storage under pressure and temperature, displayed by the elastomer powder, can be adapted to practical requirements. With decreasing linear average value of numerical distribution, the grain size of the elastomer powder is reduced; at the same time, the pourability and, respectively, shelf life of the powder are increased.

With a proportion of 1 part by weight of silicic acid per 2 parts by weight of elastomer, it is possible, for example, to adjust the particle diameter to 200-300 μm so that there are not as yet any problems with dust-like proportions, but, on the other hand, additives can still be readily incorporated. In order to obtain the desired measure of particle diameter, the linear average value of the numerical distribution is set at a range from 150 to 250 nm.

On the other hand, with a predetermined linear average value for the numerical distribution of silicic acid, the grain size of the elastomer powder and pourability (shelf stability) can be controlled by way of the elastomer/silicic acid composition. With increasing silicic acid content in the powdered elastomer, the diameter of the powder grain decreases and pourability is increased.

A further advantage of the process of this invention resides in the fact that no narrow pH range needs to be maintained during the precipitation. It is additionally possible to effect precipitation without adding an electrolyte. This results in an ecologically troublefree mode of operation.

Another significant advantage of the process is the possibility of producing pulverulent elastomer grades having a very low proportion of filler (about 35 parts by weight per 100 parts by weight of elastomer solid), while retaining good general properties.

All details of the process of this invention are fully conventional unless indicated otherwise herein and are disclosed, e.g., in German Patent No. 20 30 172, which is incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

In the examples, pH values were measured with devices from the Schott company (model CG 822) and the Metrohm company (model E 520).

The shear test measurements and the determination of compressive strength took place at 20° C. (according to Jenike and Johannson in a Flow Factor Tester—process technique 2, 10, 68 [1976]).

EXAMPLE 1 (TABLE II)

A commercially available elastomer latex (latex grade 1502 of Bunawerke Huels GmbH; styrene content; 23.5% by weight, remainder: butadiene; solids content: about 22% by weight) and a 20% by weight aqueous solution of the auxiliary precipitant [cetyl—(CH$_2$—CH$_2$—O)$_{20}$—H] are utilized. The silicic acids listed in Table I are employed as an 11% by weight suspension.

The latex and the auxiliary precipitant (1 part by weight per 100 parts by weight of elastomer solid) are mixed at room temperature in a 30-liter agitator-equipped container. There after, the silicic acid suspension is added and thoroughly mixed with the already provided components for 10 minutes (agitator: Janke and Kunkel company, model: 155/2—No 123; 2KW; 2280 rpm—peripheral speed: 15 ms$^{-1}$). Then sulfuric acid is added all at once. The amount of acid is dimensioned so that the precipitation liquid has a pH of 3.

The thus-formed precipitate is washed free of salt, filtered off, and dried under constant agitation.

EXAMPLE 2 (TABLE III)

A commercial natural latex is utilized (CV—constant viscosity; solids content: about 60% by weight; degraded in accordance with U.S. patent application Ser. No. 020929 filed Mar. 2, 1987 (DOS No. 36 06 745) (Test No. 1), along with a commercially available nitrile rubber latex ("PERBUNAN" grade N 3305; acrylonitrile content: 33% by weight; solids content: about 25% by weight) (Test No. 2). A silicic acid of type 3 (Table I) (50 parts by weight per 100 parts by weight of elastomer solid) is used. The auxiliary precipitant is, in Test 1, a 1% by weight aqueous solution of a commercially available, high molecular amine ("ROHAGIT") and, respectively, in Test 2, a 20% by weight aqueous solution of the auxiliary precipitant from Example I.

Precipitation and processing take place in accordance with Example 1.

EXAMPLE 3 (TABLE IV)

In Test 1, a commercial elastomer latex according to Example 1 and, in Test 2 and 3, a commercial nitrile rubber latex according to Example 2 are utilized. The auxiliary precipitant according to Example 1 is employed (1 part by weight per 100 parts by weight of elastomer solid). The silicic acid is that of type 3 (Table I).

A mixture is utilized of an 11% by weight aqueous silicic acid suspension and a 5% by weight aqueous carbon black suspension. The carbon black suspension (carbon black grade: "CORAX" N 339) was prepared by treating the carbon black in water by means of a commercially available dispersing device (Ultra-Turrax; 0.4 KW; 10,000 rpm, gap width: 2 mm).

Precipitation and processing takes place in accordance with Example 1.

TABLE I

| No. | BET Surface Area [m$^2$/g] | Linear Average Value of Numerical Distribution [nm] | Linear Average Value of Volume Distribution [nm] |
| --- | --- | --- | --- |
| 1 | 80 | 510 | 11 |
| 2 | 130 | 350 | 13 |
| 3 | 130 | 300 | 13 |
| 4 | 210 | 205 | 18 |

TABLE II

| Test No. | Silicic Acid (Table I) | Silicic Acid Content (*) | Jenike Test [N/m$^2$] (0 Hours; 20° C.) | Average Powder Grain Diameter (***) [μm] |
| --- | --- | --- | --- | --- |
| 1 | 1 | 50 | 990 | 410 |
| 2 | 2 | 50 | 650 | 290 |
| 3 | 3 | 50 | 340 | 210 |
| 4 | 4 | 50 | 0 | 90 |
| 5 | 3 | 40 | 780 | 390 |
| 6 | 3 | 30 | 1,600 | 500 |
| 7 | 3 | 35 + 5 (**) | 240 | 180 |
| 8 | 3 | 25 + 5 (**) | 890 | 390 |

(*) Parts by weight per 100 parts by weight of elastomer solid
(**) Addition in two steps, the second part thereof after precipitation of elastomer
(***) Determination of powder grain diameter according to DIN 4188, page 1/2

TABLE III

| Test No. | Contents of Auxiliary Precipitation (*) | pH Value () | Jenike Test [N/m$^2$] (0 Hours; 20° C.) | Average Powder Grain Size (*) [μm] |
| --- | --- | --- | --- | --- |
| 1 | 3 | 7.0 | 1,050 | 380 |
| 2 | 1 | 3.0 | 240 | 260 |

(*) Parts by weight per 100 parts by weight of elastomer solid
(**) In the precipitation liquid
(***) Determination of powder grain diameter according to DIN 4188, page 1/2

TABLE IV

| Test No. | Silicic Acid Content (*) | Carbon Black Content (*) | Jenike Test [N/m$^2$] (0 Hours; 20° C.) | Average Powder Grain Size (**) [μm] |
| --- | --- | --- | --- | --- |
| 1 | 50 | 5 | 30 | 220 |
| 2 | 40 | 20 | 10 | 390 |
| 3 | 45 | 5 | 20 | 310 |

(*) Parts by weight per 100 parts by weight of elastomer
(**) Determination of powder grain diameter according to DIN 4188, page 1/2

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a free flowing, powdered elastomer filled with silicic acid by precipitating an elastomer latex in the presence of silicic acid and an auxiliary precipitant, using an acid, the improvement wherein the silicic acid employed exhibits the following properties:

(a) SiO$_2$ content about 82–91.5% by weight;
   (b) metallic oxides content about 0.5–3% by weight;
   (c) loss on ignition, measured at 1000° C., about 8–15% by weight;
   (d) moisture content, measured at 105° C., about 2–10% by weight;
   (e) surface area of the primary particles about 40–250 m$^2$/g;
   (f) dibutyl phthalate absorption, based on measured weight, about 170–290%;
   (g) linear average of numerical distribution of secondary particles about 10–2,000 nm;
   (h) linear average of volume distribution of secondary particles about 3–30 μm;
   (i) proportion of secondary particles with a diameter of less than 1 μm about 0.01–5% by weight
   wherein the percentages of parameters (a) to (c), add up to 100% by weight.

2. A process according to claim 1, wherein the dibutyl phthalate absorption of the silicic acid is 200–280%.

3. A process according to claim 1, wherein the linear average of the quantitative distribution of the secondary particles of the silicic acid is 200–600 nm.

4. A process according to claim 1, wherein the linear average of the volume distribution of the secondary particles of silicic acid is 5–20 μm.

5. A process according to claim 1, wherein the SiO$_2$ content of the silicic acid is 85–90% by weight.

6. A process according to claim 1, wherein the loss of ignition of the silicic acid is 10–12% by weight.

7. A process according to claim 1, wherein the moisture content of the silicic acid is 4–7% by weight.

8. A process according to claim 1, wherein the surface area of the primary particles of silicic acid is 130–200 m$^2$/g.

9. A process according to claim 1, wherein the proportion of secondary particles of silicic acid with a diameter of less than 1 μm is 0.5–1.5% by weight.

10. A process according to claim 1, wherein the elastomer latex is a styrene-butadiene latex with a styrene proportion of about 15–30% by weight in the copolymer.

11. A process according to claim 1, wherein the amount of auxiliary precipitant employed is about 0.1–15 parts by weight based on 100 parts by weight of elastomer solids within the latex.

12. A process according to claim 1, wherein the amount of auxiliary precipitant employed is 0.5–2 parts by weight based on 100 parts by weight of elastomer solids within the latex.

13. A process according to claim 1, wherein precipitation is performed at a temperature of about 15°–90° C.

14. A process according to claim 1, further conprising treating the resultant filled elastomer with about 1 to 100 parts by weight of plasticizer oil based on 100 parts by weight of elastomer solid in the filled elastomer.

15. A process according to claim 1, wherein a silicic acid suspension is combined with an elastomer latex and said silicic acid suspension contains about 2–12% by weight silicic acid.

16. A free flowing, silicic-acid-filled, powdered elastomer having a particle diameter of about 50–500 μm, produced in accordance with claim 1.

17. A powdered elastomer according to claim 16, wherein the elastomer has a particle diameter of 200–300 μm.

18. A powdered elastomer according to claim 16, wherein the elastomer contains about 20–200 parts by weight silicic acid based on 100 parts by weight elastomer solid in the elastomer powder.

19. A powdered elastomer according to claim 18, wherein the elastomer contains about 50–500 parts by weight silicic acid based on 100 parts by weight elastomer solid in the elastomer powder.

20. A composition comprising an elastomer latex and a silicic acid having the following properties:
  (a) $SiO_2$ content about 82–91.5% by weight;
  (b) metallic oxides content about 0.5–3% by weight;
  (c) loss on ignition, measured at 1000° C., about 8–15% by weight;
  (d) moisture content, measured at 105° C., about 2–10% by weight;
  (e) surface area of the primary particles about 40–250 $m^2/g$;
  (f) dibutyl phthalate absorption, based on measured weight, about 170–290%;
  (g) linear average of quantitative distribution of secondary particles about 10–2,000 nm;
  (h) linear average of volume distribution of secondary particles about 3–30 μm;
  (i) proportion of secondary particles with a diameter of less than 1 μm about 0.01–5% by weight produced in accordance with the process of claim 1.

* * * * *